(12) United States Patent
Herbst

(10) Patent No.: US 8,474,369 B2
(45) Date of Patent: Jul. 2, 2013

(54) ELECTRIC SKILLET WITH MAGNETIC SELF-REVERSING STIRRER THAT IS REMOVABLE

(76) Inventor: Walter B. Herbst, Lake Forest, IL (US)

( * ) Notice: Subject to any disclaimer, the term of this patent is extended or adjusted under 35 U.S.C. 154(b) by 1267 days.

(21) Appl. No.: 11/021,170

(22) Filed: Dec. 21, 2004

(65) Prior Publication Data

US 2006/0112838 A1    Jun. 1, 2006

Related U.S. Application Data

(60) Provisional application No. 60/630,847, filed on Nov. 26, 2004.

(51) Int. Cl.
*A21B 7/00* (2006.01)
(52) U.S. Cl.
USPC ............... 99/348; 99/352; 366/241; 366/274; 366/279; 366/601
(58) Field of Classification Search
USPC ........... 99/326–333, 339–348, 483, 403–425, 99/352; 366/189–205, 345–349, 274, 241, 366/279, 601; 219/432–442
See application file for complete search history.

(56) References Cited

U.S. PATENT DOCUMENTS

| | | | | |
|---|---|---|---|---|
| 2,459,224 A | * | 1/1949 | Hendricks | 366/274 |
| 2,486,151 A | * | 10/1949 | Gross et al. | 318/282 |
| 2,549,121 A | * | 4/1951 | Osterheld | 366/274 |
| 2,752,800 A | * | 7/1956 | Raymond et al. | 74/361 |
| 2,951,689 A | * | 9/1960 | Asp et al. | 416/3 |
| 3,113,228 A | * | 12/1963 | Tolegian | 310/103 |
| 3,302,089 A | * | 1/1967 | Rosa et al. | 318/257 |
| 3,384,353 A | * | 5/1968 | Worth | 366/274 |
| 3,528,103 A | * | 9/1970 | Wolf | 318/754 |
| 4,410,280 A | * | 10/1983 | Yamauchi et al. | 366/314 |
| 4,473,001 A | * | 9/1984 | Rieger | 99/277.2 |
| 4,568,192 A | * | 2/1986 | Kudermann et al. | 366/146 |
| 4,649,810 A | * | 3/1987 | Wong | 99/326 |
| 4,836,826 A | * | 6/1989 | Carter | 464/29 |
| 4,993,840 A | * | 2/1991 | Maeda et al. | 366/205 |
| 5,074,201 A | * | 12/1991 | Takeyama et al. | 99/483 |
| 5,154,348 A | * | 10/1992 | Ratnik et al. | 239/14.2 |
| 5,478,149 A | * | 12/1995 | Quigg | 366/273 |
| 5,533,800 A | * | 7/1996 | Stiegelmann et al. | 366/142 |

(Continued)

FOREIGN PATENT DOCUMENTS

DE    20016381 U1 *    2/2001

*Primary Examiner* — Henry Yuen
*Assistant Examiner* — Brett Spurlock
(74) *Attorney, Agent, or Firm* — Knechtel, Demeur & Samlan

(57) ABSTRACT

A cooking skillet that provides a unique automatic stirring system for continuously stirring foods during cooking. The cooking skillet comprises a base, a receptacle, a heating element, and an automatic stirring system. The automatic stirring system comprises a stirring wand located in the receptacle and a bracket located in the base. The stirring wand and the bracket are attracted to each other through magnetic forces that provide sufficient magnetism to attract one to the other. A motor is attached to the bracket by a connecting rod and provides the means to rotate the bracket in a clockwise direction. The magnetism between the magnets in the bracket and the magnets in the stirring wand forces the stirring wand to rotate in connection with the bracket. During rotation, the stirring wand is designed to mix the food contained within the receptacle. A controlling box is used to control the power to the motor and provides a resisting sensor or reversing circuit to reverse the rotational direction of the stirring system as necessary.

9 Claims, 5 Drawing Sheets

U.S. PATENT DOCUMENTS

| | | | | |
|---|---|---|---|---|
| 5,642,247 A * | 6/1997 | Giordano | | 361/31 |
| 5,766,661 A * | 6/1998 | Lee | | 426/231 |
| 5,906,105 A * | 5/1999 | Ugolini | | 62/136 |
| 6,021,707 A * | 2/2000 | Bauer et al. | | 99/337 |
| 6,318,247 B1 | 11/2001 | Di Nunzio et al. | | |
| 6,324,964 B1 * | 12/2001 | Niederberger et al. | | 99/287 |
| 6,332,706 B1 * | 12/2001 | Hall | | 366/274 |
| 6,453,801 B1 * | 9/2002 | Masel et al. | | 99/330 |
| 6,540,888 B2 * | 4/2003 | Robey et al. | | 204/275.1 |
| 6,586,714 B2 * | 7/2003 | Kawamura et al. | | 219/711 |
| 6,629,491 B1 * | 10/2003 | Chan | | 99/331 |
| 6,666,574 B1 * | 12/2003 | Pryor | | 366/205 |
| 6,712,497 B2 * | 3/2004 | Jersey et al. | | 366/274 |
| 6,758,593 B1 * | 7/2004 | Terentiev | | 366/273 |
| 6,777,010 B1 * | 8/2004 | Rolle et al. | | 426/238 |
| 6,793,167 B2 * | 9/2004 | Karkos et al. | | 241/101.2 |
| 7,270,156 B2 * | 9/2007 | Beesley et al. | | 99/348 |
| 7,312,425 B2 * | 12/2007 | DeCobert et al. | | 219/433 |
| 2002/0196705 A1 * | 12/2002 | Jersey et al. | | 366/274 |
| 2003/0024401 A1 * | 2/2003 | Zetterlund | | 99/452 |
| 2003/0057793 A1 * | 3/2003 | Yang | | 310/191 |
| 2003/0128626 A1 * | 7/2003 | Verkerk | | 366/140 |
| 2003/0192435 A1 * | 10/2003 | McNair | | 99/330 |
| 2004/0065211 A1 * | 4/2004 | McNair | | 99/348 |
| 2004/0159244 A1 * | 8/2004 | Leason | | 99/348 |

* cited by examiner

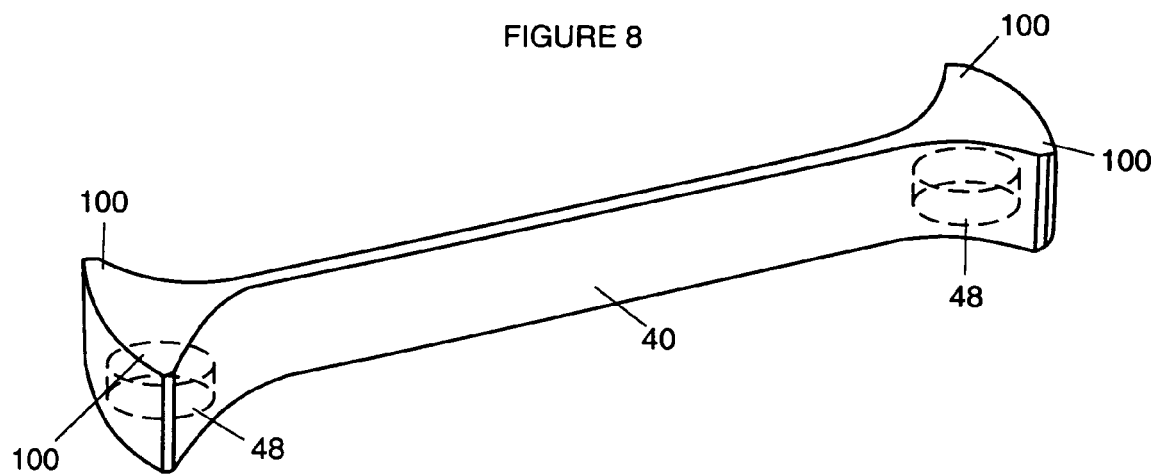
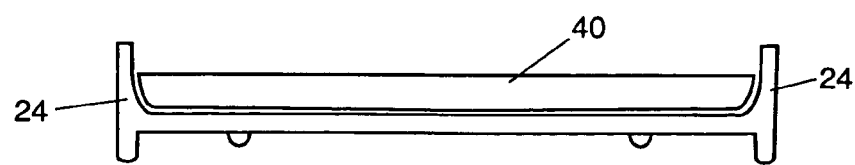

ELECTRIC SKILLET WITH MAGNETIC SELF-REVERSING STIRRER THAT IS REMOVABLE

Cross-Reference to Related Application

This patent application is a non-provisional application claiming priority from U.S. Provisional Application Ser. No. 60/630,847, entitled "Electric Stirring Skillet" filed on Nov. 26, 2004.

I. FIELD OF THE INVENTION

The present invention relates to cooking skillets and, more particularly, to a cooking skillet that provides a unique automatic stirring system which uses an electrically controlled, motor driven, magnetic stirring wand for continuously stirring foods during cooking to obtain the desired cooking results of various foods and tastes.

II. DESCRIPTION OF THE PRIOR ART

Using cooking skillets results in the innate problem of uneven cooking. Food on or adjacent to the heated cooking surface is subjected to the highest temperatures and has a greater probability of overcooking or burning. Furthermore, during cooking, water or sauces are absorbed into the food and/or evaporated into the air due to the heat from the cooking skillet. As the volume of sauce varies across the surface area of the cooking skillet, portions of the food are exposed to and absorb lower concentrations of the sauce. Despite every attempt by the cooker to manually move or adjust the food and sauces as best as possible, all portions of the food typically do not cook uniformly.

Applicant has solved this problem with its unique cooking skillet having an automatic stirring wand which continuously stirs the food and sauce within the cooking skillet. This enables the food and sauce to be more evenly distributed throughout the cooking skillet and thereby uniformly cook the food.

III. OBJECTS OF THE INVENTION

It is the primary object of the present invention to provide a cooking skillet that more evenly cooks food being cooked therein. A related object of the present invention is to provide an automatic stirring wand located within the cooking skillet for continuously stirring the food being cooked therein.

Another related object of the present invention is to provide a stirring wand and bracket that are magnetically coupled to each other. A related object is to provide a stirring wand having magnets therein or produced from steel or an alloy, or a wand with steel or alloy inserts for allowing magnetic coupling with an external magnet system.

Another object of the invention is to provide an electrically controlled motor for rotating the bracket thereby causing the stirring wand to move in relation to the receptacle of the cooking skillet and stir the food therein.

Yet another object of the present invention is to provide a control means that releases and/or reverses the stirring wand when the wand encounters an impediment to its free rotation.

Still another object of the invention is to provide a device that is safe and easy to use.

Other objects of the present invention will become more apparent to persons having ordinary skill in the art to which the present invention pertains from the following description taken in conjunction with the accompanying drawings.

IV. SUMMARY OF THE INVENTION

The present invention is a cooking skillet that provides a unique automatic stirring system for continuously stirring foods during cooking. The cooking skillet comprises a base, a receptacle, a heating element, and an automatic stirring system. The automatic stirring system comprises a stirring wand located in the receptacle or vessel and a bracket located in the base. The stirring wand and the bracket may each contain magnets or one may contain ferrous metal only to provide sufficient magnetism to attract one to the other. A motor is attached to the bracket by a connecting rod and provides the means to rotate the bracket in a clockwise direction. The magnetism between the magnets in the bracket and the magnets or ferrous material in the stirring wand forces the stirring wand to rotate in connection with the bracket. During rotation, the stirring wand is designed to mix the food contained within the receptacle. A controlling box is used to control the power to the motor and provides a resisting sensor or reversing circuit to reverse the rotational direction of the stirring system as necessary.

V. BRIEF DESCRIPTION OF THE DRAWINGS

The Description of the Preferred Embodiment will be better understood with reference to the following figures:

FIG. 8 is a perspective view of an alternative stirring wand.

FIG. 9 is a side elevation view of the alternative stirring wand of FIG. 8 in the cooking skillet.

VI. DETAILED DESCRIPTION OF THE PREFERRED EMBODIMENT

Figure 1:
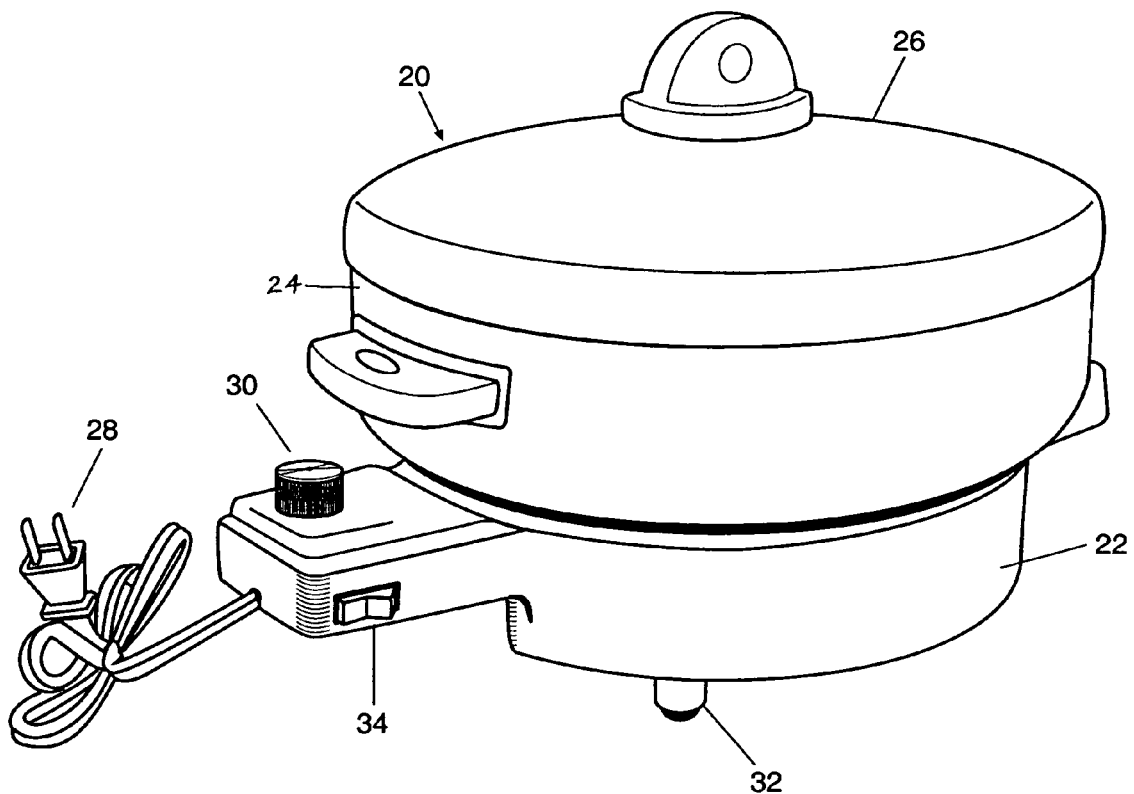
FIG. 1 is a perspective view of Applicant's inventive cooking skillet.

Turning first to FIG. 1, there is illustrated a cooking skillet 20 having a base 22, a receptacle 24, and a lid 26. Feet 32, as illustrated more clearly in FIG. 3, are used to support the cooking skillet 20.

The base 22 is provided with an electrical cord 28 for providing power to the cooking skillet 20. A rheostat 30 is used for regulating the electric current provided from the electrical cord 28 to a heating element 29 in the base for controlling the temperature of the food to be cooked within the receptacle 24. A power switch 34 is provided to toggle between an "on" position in which electric power is being supplied to the cooking skillet 20 and an "off" position in which electric power is prohibited from being supplied to the cooking skillet 20.

Figure 2:
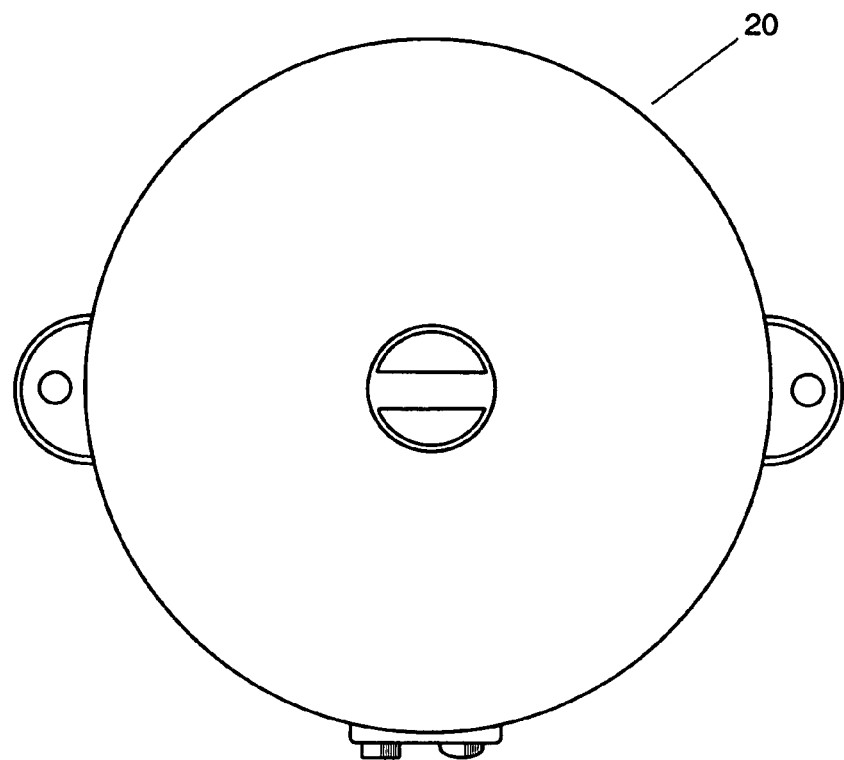
FIG. 2 is top view of Applicant's inventive cooking skillet.

The cooking skillet 20, as illustrated in FIG. 2, is preferably circular in shape. Alternatively, it is contemplated that the shape of the cooking skillet 20 may be any other shape provided that the cooking skillet 20 is designed to accommodate Applicant's intended invention as disclosed herein.

Figure 3:
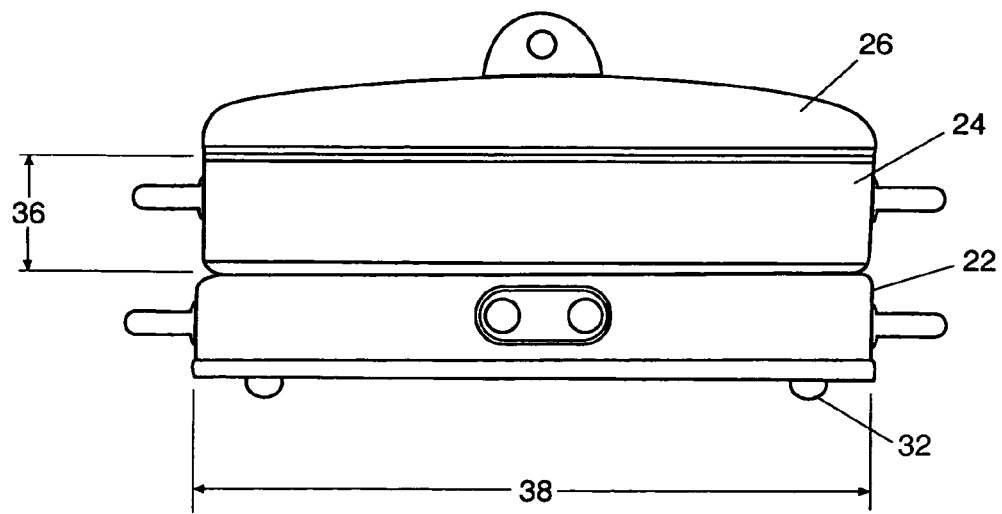
FIG. 3 is a side view of Applicant's inventive cooking skillet.

As depicted in FIG. 3, the receptacle 24 has a receptacle height 36 and a receptacle length 38. In the preferred embodiment, the receptacle height 36 is sufficient to receive and cook the desired food within the receptacle 24.

Figure 4:
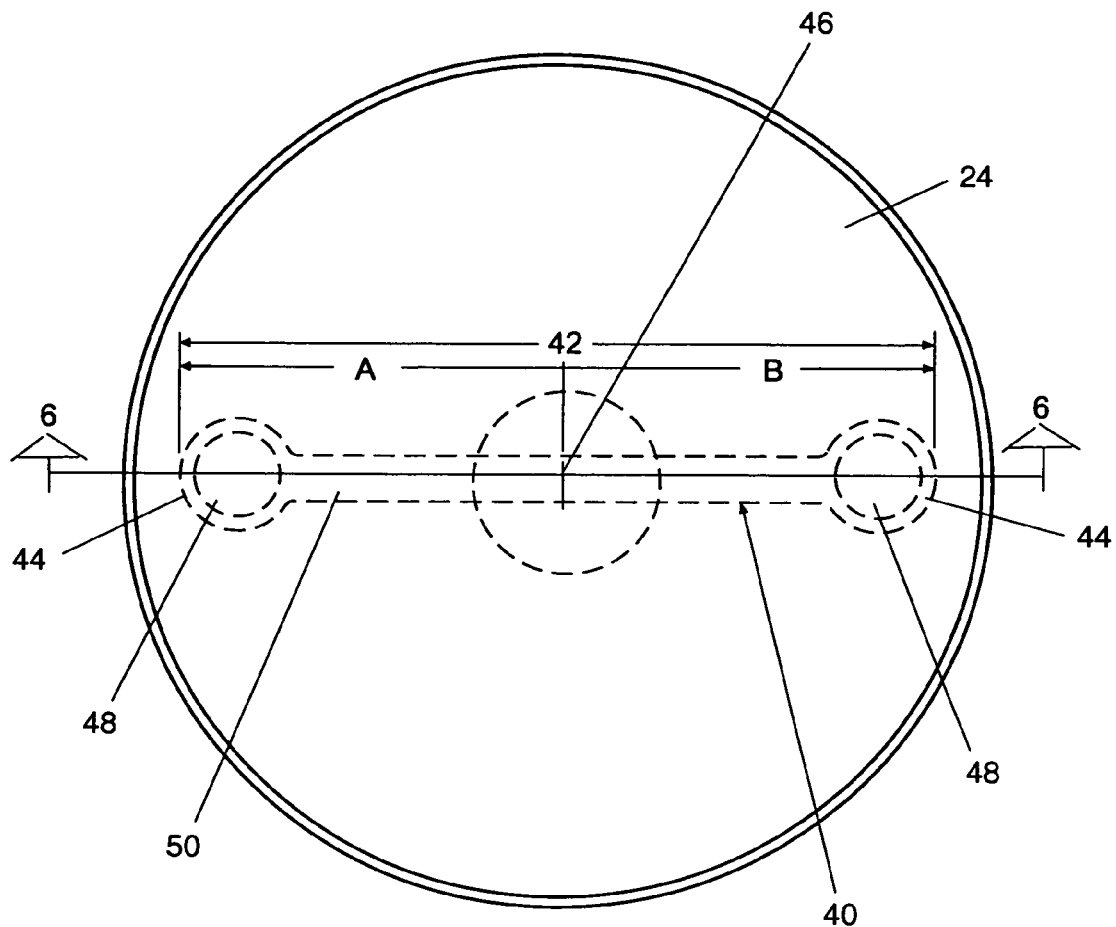
FIG. 4 is a top view, with portions removed, of Applicant's inventive cooking skillet and, in particular, illustrating the stirring wand within the receptacle.

Turning to FIG. 4, a stirring wand 40 is situated within the receptacle 24. The stirring wand 40 has a wand length 42. In the preferred embodiment, the stirring wand 40 extends across substantially the entire diameter of the receptacle 24 and has a wand length 42 which is slightly less than the receptable length 38. As depicted, the wand length 42 of the stirring wand 40 is divided into an elongated member 50 having a centerpoint 46 and opposed ends 44. The elongated member 50 is preferably made of a cast stamped aluminum. Alternatively, the elongated member 50 may be made of any other type of material provided that the material is suitable to withstand the varying temperatures of the cooking skillet 20 and serve the purpose for which it is used as disclosed herein. In the preferred embodiment, the centerpoint 46 coincides with the centerpoint of the receptacle 24.

Situated at each opposed end 44 is a magnet 48. In the preferred embodiment, the magnet 48 is a ceramic magnet. Alternatively, the magnet 48 may be replaced by material such as steel or an alloy of neodymium, iron and boron, or other suitably strong magnetic ferrous or ferromagnetic material, which defines a magnetic area in the stirring wand 40.

Figure 5:
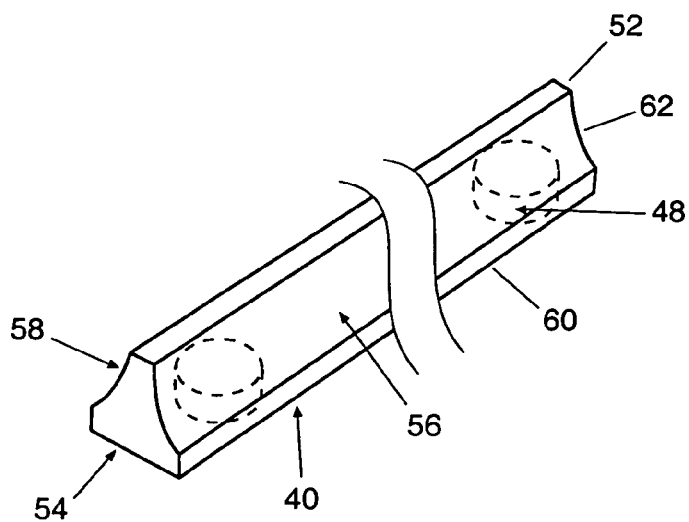
FIG. 5 is a perspective view, with portions removed, of the stirring wand.

The stirring wand 40, as more clearly illustrated in FIG. 5, has a top 52, a bottom 54, a front side 56, and a back side 58. The bottom 54 is preferably a smooth, flat surface. The front side 56 and back side 58 each have a leading edge 60 and a cambered surface 62. The leading edge 60 is preferably at a slight angle to the bottom 54 to easily get beneath the food in the receptacle 24 and lift it. The cambered surface 62 extends from the leading edge 60 to the top 52. The cambered surface 62 is concave in shape. Alternatively, the stirring wand 40 may be designed with a front side 56 that has a flat surface which is angled with respect to the receptacle 24. The front side 56 and the back side 58 are preferably symmetrical about the top 52 or, in other words, are a mirror image of one another. The reason that the front side 56 and the back side 58 are symmetrical is that the automatic stirring system of the cooking skillet 20 enables the stirring wand 40 to operate in either direction of rotation. As a result and discussed in further detail below, when the stirring wand 40 rotates counterclockwise about the centerpoint 46 within the receptacle, the front side 56, located on portion A of the stirring wand 40 (FIG. 4), and the back side 58, located on portion B of the stirring wand 40 (FIG. 4), lead the movement of the stirring wand 40 and engage the foodstuff and sauce within the receptacle 24. Likewise, when the stirring wand 40 rotates clockwise about the centerpoint 46 within the receptacle, the front side 58, located on portion B of the stirring wand 40, and the back side 58, located on portion A of the stirring wand 40, lead the movement of the stirring wand 40 and engage the foodstuff and sauce within the receptacle 24. As the front side 56 and the back side 58 lead the direction of the stirring wand 40, the leading edge 60 of each is designed to engage and lift the foodstuff and sauce from its current position within the receptacle 24. If certain foodstuff has adhered to the heated receptacle 24, the leading edge 60 will attempt to force the foodstuff to lift and disengage from the receptable 24. Depending on the force required to disengage the adhered food, the stirring wand 40 may or may not have sufficient force to loosen and disengage adhered food. To solve this problem, Applicant has devised a reversing control system that will be more fully described later.

Once the foodstuff is lifted and displaced from its current position in the receptacle 24 by the leading edge 60, the foodstuff continues upwardly and into contact with the cambered surface 62. Since the stirring wand 40 is rotating about the centerpoint 46, the foodstuff and sauce located in closest proximity to the centerpoint 46 will be engaged first by the stirring wand 40 and then so on toward the outer periphery of the receptacle 24. In this manner, as the stirring wand 40 rotates, the foodstuff and sauce will be forced along the cambered surface 62 toward the outer periphery of the receptacle 24 or up and over the top 52 of the stirring wand 40. Alternatively, the stirring wand 40 may be provided with curved ends 100, as illustrated in FIGS. 8 and 9, for forcing some of the foodstuff back towards the center of the receptacle 24. As seen in FIG. 9, the ends 100 closely engage the sides of the receptacle 24.

During this movement, the foodstuff and sauce will be displaced from its current position, mixed with the other concentrations of foodstuff and sauce, and come to rest again in another position within the receptacle 24. The new mixture and concentrations of foodstuff and sauce will continue to cook in this position within the receptacle 24 until it is displaced again by the stirring wand 40. This process continues until the foodstuff reaches its desired cooking result and taste.

During this process, the magnets 48 are located within the stirring wand 40 and designed to engage the receptacle 24. In this manner, the magnets 48 do not come in contact with or otherwise engage the foodstuff and sauce.

Figure 6:
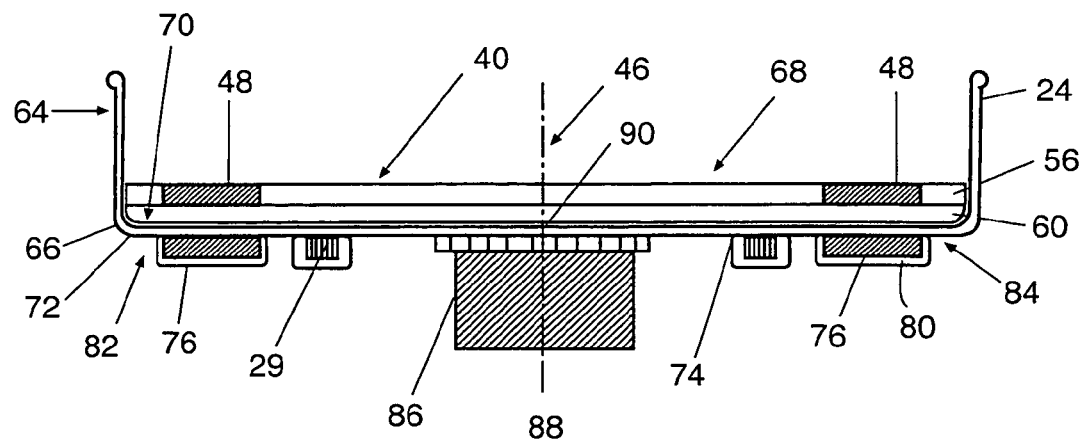
FIG. 6 is a cross sectional view, taken along line 6-6 of FIG. 4, and, in particular, illustrating the drive system for the automatic stirring system.

Turning to FIG. 6, the manner in which the automatic stirrer system operates is more fully depicted. The receptacle 24 has a vertical side 64 that extends around the entire circumference of the cooking skillet 20, a horizontal bottom 66 having a top 70 and a bottom 72, and defines an opening 68 between them. The stirring wand 40 is located in the opening 68 adjacent to the top 70 of the receptacle 24. In the preferred embodiment, the stirring wand 40, using its weight, rests on the top 70 of the horizontal bottom 66.

Situated on the opposite side of the horizontal bottom 66 from the stirring wand 40 and within the base 22 of the cooking skillet 20 is the heating element 29. The heating element 29 is preferably mounted to the bottom 72 of the receptacle 24. The heating element 29 is powered from the electricity passed through the electric cord 28 and controlled by the rheostat 30 for cooking the food therein.

Also located within the base 22 is a stamped bracket 74. The stamped bracket 74 extends across substantially the receptacle length 38 (FIG. 3) of the cooking skillet 20 and has opposed ends 82 and 84 separated by a bracket centerpoint 88. At each end 82 and 84 are pockets 80 which are used to frictionally secure magnets 76. Alternatively, a magnetic material such as steel or an alloy of neodymium, iron and boron, or other suitably strong magnetic ferrous or ferromagnetic material may be placed in the bracket 74, which defines a magnetic area in the bracket 74. In the preferred embodiment, the magnets 76 are located within the pockets 80 in direct vertical alignment with the magnets 48 contained within the stirring wand 40. The magnets 76 are preferably identical to the magnets 48. Alternatively, the magnets 76 may be replaced with a ferrous and/or ferromagnetic structure provided that this type of structure creates sufficient magnetic strength to attract and remain magnetically connected to the magnets 48 of the stirring wand 40. Alternatively, it is contemplated that the reverse would work (i.e., that magnets 48 of the stirring wand 40 may be replaced with a magnetic area and the magnets 76 of the bracket 74 are ceramic magnets). The important point is that at least one of the bracket 74 or the stirring wand 40 has a magnet mounted in it and the other complimentary magnetically coupled piece has a magnetic area that is attracted to the magnet.

Figure 7:
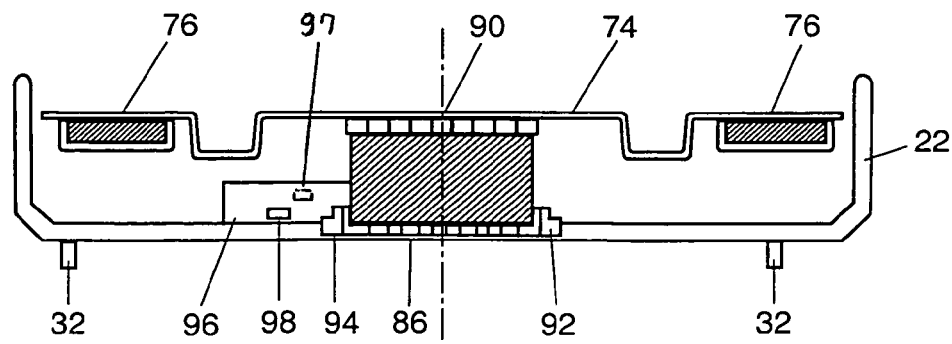
FIG. 7 is a side view, with portions removed, of the bracket and other components of the automatic stirring system contained within the base of the cooking skillet.

The bracket 74 is attached to a motor 86 by a connecting rod 90 as illustrated in FIG. 7. In the preferred embodiment, the connecting rod 90 is located at the bracket centerpoint 88. The motor 86 is affixed to the base 22 using blocks 92. Preferably, a cushion 94 is placed between the block 92 and the motor 86 for absorbing the vibration caused by the motor 86 while in use. Alternatively, any other means known to one skilled in the art may be used to secure the motor 86 to the base 22.

A controlling box 96 is attached to the motor 86. The controlling box 96 powers the motor 86 to rotate the connecting rod 90 which then rotates the bracket 74. The controlling box 96 is powered from the electricity passed through the electric cord 28 and directed to the controlling box 96. A control box power switch 98 is used to toggle between an "on" position in which electric power is being fed to the motor 86 and an "off" position in which electric power is prohibited from being fed to the motor 86.

In use, when powered and the control box power switch 98 is toggled to the "on" position, the motor 86 rotates the controlling rod 90 in a clockwise direction. As the controlling rod 90 is attached to the bracket 74, the bracket 74 is forced to rotate in the same clockwise direction underneath the receptacle 24. The magnets 76 within the bracket 74 are magnetically attracted to magnets 48 within the stirring wand 40 which pulls the magnets 48 into the horizontal bottom 66 and forces the stirring wand 40 into a tight engagement to the receptacle 24. The rotation of the bracket 74 about the bracket centerpoint 88 rotates the magnets 76 located in the pockets 80 to move along the periphery of the base 22. Due to the magnetism created between magnets 76 and magnets 48, the rotational movement of magnets 76 pulls magnets 48 which, in turn, forces the stirring wand 40 to rotate clockwise within the receptacle 24. As the stirring wand 40 rotates within the receptacle 24, the stirring wand 40 stirs the food that is being cooked.

If, while stirring, the stirring wand 40 engages adhered food and the stirring wand 40 is not able to lift or disengage the adhered food from the horizontal bottom 66 of the receptacle 24, the stirring wand 40 will be prohibited by the adhered food from continuing to rotate and thereby forced to stop or slow down. When this occurs, the magnetic force between magnets 48 and magnets 76 will also restrict the bracket 74 from easily rotating. This, in turn, will likewise force the connecting rod 90 from continuing to rotate and begin to cause an overload or impediment within the motor 86. To prevent any damage to the motor 86 and continue the automatic stirring system with the cooking skillet 20, the controlling box 96 utilizes a resisting sensor or current sensing controller that monitors the current to the motor 86. When the current exceeds a predetermined level, a reversing circuit 97 in the controlling box 96 reverses the rotational direction of the motor 86 and connecting rod 90 to the counter-clockwise direction. As a result, the bracket 74 and ultimately the stirring wand 40 are likewise forced to reverse their rotation to the counter-clockwise direction. The stirring wand 40 will then continue stirring food in this reversed or opposite direction within the receptacle 24 until it reaches the same adhered food that caused the original direction change. This time, should the stirring wand 40 lift and disengage the adhered food, the stirring wand 40 will continue in this counter-clockwise direction until the food is cooked as desired. If, however, the adhered food or a different portion of food prevent the stirring wand 40 from proceeding, the rotation of the stirring wand 40 will again be reversed by the reversing control system to the clockwise direction. The automatic stirring system will continue in this manner until the adhered food is finally lifted and disengaged from the receptacle 24 and/or the food becomes cooked.

In an alternate embodiment, the bracket 74 is connected to the motor 86 by means of a clutch. The clutch disengages when the stirring wand 40 engages the adhered food and the driving force of the motor 86 exceeds the clutch release force. The motor 86 continues to rotate but the connecting rod 90 disengages from the motor until the adhered food is loosened.

Thus, there has been provided a unique cooking skillet with automatic stirring system. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the appended claims.

What is claimed is:

1. A cooking skillet for cooking a food product, comprising:
    a cooking receptacle having a bottom surface and an upwardly extending sidewall from the bottom surface, the bottom surface and the upwardly extending sidewall forming a contained cooking area;
    means for providing heat to the cooking receptacle for cooking the food product in the cooking area;
    a stirring wand supported for rotation about an axis inside the cooking area and having first opposed ends each providing a vertical surface, the stirring wand resting on the bottom surface and extending across the entire cooking area, the vertical surface of each of the opposed ends situated adjacent to but not touching the upwardly extending sidewall;
    the stirring wand having a top, a bottom, a front side, and a back side substantially identical to the front side, the front side having a leading edge extending substantially vertically from adjacent the bottom to a termination point and a concave surface extending upwardly from the termination point of the leading edge to the top, the leading edge providing a substantially flat surface along the stirring wand between the vertical surfaces of the first opposed ends, the concave surface providing a constant uniform curvature along the stirring wand between the vertical surfaces of the first opposed ends;
    a first magnet mounted in the stirring wand;
    a bracket supported for rotation about the axis outside the cooking area and adjacent to the stirring wand;
    a second magnet mounted in the bracket,
    a motor having an output shaft coupled to the bracket, the motor engaging the output shaft and driving the rotation of the bracket about the axis;
    the second magnet in the bracket magnetically engaging to the first magnet in the stirring wand during rotation to drive the stirring wand to rotate in the same direction as the bracket to stir the food product in the cooking area wherein the leading edge and the concave surface of the front side of the stirring wand cooperating in lifting the food product from the bottom surface in the cooking area and the first opposed ends and vertical surface of the stirring wand directing the food product away from the upwardly extending sidewall of the cooking receptacle during rotation of the stirring wand;

a reversing circuit having means for reversing the direction of rotation of the motor when the level of current to the motor exceeds a predetermined level;

wherein, when the level of current to the motor exceeds the predetermined level, the motor re-engaging the output shaft and driving the rotation of the bracket in the reverse direction and the second magnet in the bracket magnetically re-engaging the first magnet in the stirring wand during rotation to drive the rotation of the stirring wand in the same reverse direction; and wherein, in this reverse direction, the leading edge and the concave surface of the back side of the stirring wand cooperating in lifting the food product from the bottom surface in the cooking area and the first opposed ends and vertical surface of the stirring wand directing the food product away from the upwardly extending sidewall of the cooking receptacle during rotation of the stirring wand.

2. The cooking skillet of claim 1 wherein the first magnet is mounted in at least one of the first opposed ends of the stirring wand.

3. The cooking skillet of claim 2 wherein the bracket has second opposed ends with the second magnet mounted in at least one of the second opposed ends, the first magnet vertically aligned with the second magnet when the stirring wand is vertically aligned with the bracket.

4. The cooking skillet of claim 1 and further comprising a controlling box, the controlling box having means for monitoring the level of current to the motor.

5. The cooking skillet of claim 1 wherein the first opposed ends and vertical surface directing the food product away from the upwardly extending sidewall of the cooking receptacle independently of the direction of rotation of the stirring wand.

6. A stirring mechanism for stirring a food product in a skillet, comprising:

a cooking vessel having a cooking surface and a wall situated around the cooking surface, the cooking surface and the wall forming a contained cooking area;

a stirring wand resting on the cooking surface and extending across the entire cooking surface and provided with opposed ends having a curved portion, the opposed ends situated adjacent to but not touching the upwardly extending sidewall, the stirring wand having a top, a bottom, a front side, and a back side substantially identical to the front side, the front side extending substantially vertically from adjacent the bottom to the top;

the curve of each of the opposed ends directing the food product away from the wall independently of the direction of rotation of the stirring wand, the stirring wand aligned in a rotational plane;

means for providing heat to the cooking surface for cooking the food product in the cooking area;

a first magnetic area paired with the stirring wand;

a bracket situated adjacent to the stirring wand and aligned parallel to the rotational plane;

a second magnetic area paired with the bracket, a motor having an output shaft, the motor engaging the output shaft and driving the rotation of the bracket in a direction;

the second magnetic area of the bracket magnetically engaging the first magnetic area of the stirring wand during rotation to drive the rotation of the stirring wand in the rotational plane as the bracket is rotated, the stirring wand rotating in the same direction as the rotation of the bracket;

wherein, during rotation of the stirring wand, the front side of the stirring wand cooperating in lifting the food product from the cooking surface in the contained cooking area and the curved portion of the opposed ends of the stirring wand directing the food product away from the wall of the contained cooking area;

means for monitoring the level of current to the motor;

means for reversing the direction of rotation of the motor into a reverse direction when the food product impedes the rotation of the stirring wand causing the level of current to the motor to reach a predetermined maximum level;

the motor re-engaging the output shaft and driving the rotation of the bracket in the reverse direction and the second magnetic area of the bracket magnetically re-engaging the first magnetic area of the stirring wand during rotation to drive the rotation of the stirring wand in the same reverse direction;

wherein, during rotation of the stirring wand in the reverse direction, the back side of the stirring wand cooperating in lifting the food product from the cooking surface in the contained cooking area and the curved portion of the opposed ends of the stirring wand directing the food product away from the wall of the contained cooking area.

7. The stirring mechanism of claim 6 wherein the first magnetic area is situated along substantially the entire length of the stirring wand.

8. The stirring mechanism of claim 6 wherein the second magnetic area is a bar magnet.

9. The stirring mechanism of claim 6 wherein the second magnetic area is made from an alloy consisting of neodymium, iron and boron.

* * * * *